United States Patent Office 2,934,517

Patented Apr. 26, 1960

2,934,517

POLY-CAPROAMIDE-6 CONTAINING N-ACYL p-AMINOPHENOL

David W. Young, Homewood, Ill., assignor to Sinclair Refining Company, New York, N.Y., a corporation of Maine

No Drawing. Application September 25, 1958 Serial No. 763,170

4 Claims. (Cl. 260—45.9)

This invention relates to a novel composition which comprises a major amount of nylon 6 and a minor amount of a high molecular weight amide, in particular N-acyl p-amino phenol.

The synthetic linear polyamide known as nylon 6 has found a variety of uses, for example, as films, molded articles, coatings, yarns, tire cords, etc. Although the polymer is characterized by high tensile strength, large elongation and moderate impact strength at normal temperature, it is common knowledge that when held at high temperatures, i.e. temperatures above about 100° C. it suffers loss with respect to these physical properties, particularly that of tensile strength. To be able to minimize the loss of high tensile strength at high temperatures becomes desirable in many cases, for instance, in hot ironing of nylon fabrics or in the employment of nylon threads as tire cord.

It has now been found that the addition of small amounts of a high molecular weight amide, that is N-acyl p-amino phenol to nylon 6 produces a polymer of improved tensile strength at elevated temperatures. The acyl radical of the substituted phenol can have from about 12 to 22 carbon atoms.

One N-acyl p-amino phenol, i.e. N-stearoyl p-amino phenol, is sold under the trade name "Suconox-18." It is a white solid which melts at 131–134° C. (268–273° F.) and can be heated to above 250° C. (482° F) without any detectable evidence of decomposition, and appears to be non-toxic.

N-acyl p-amino phenols are prepared in general by reacting an approximately equimolar amount of a carboxylic acid with the amino phenol in the presence of a solvent or water-entraining agent such as benzene, toluene or xylene. The solid product is then dehydrated by evaporation and the product is obtained in relatively pure form.

The N-acyl p-amino phenol is used in minor amounts in the synthetic linear polyamide of the present invention and usually over the concentration range of about 0.001 to 1.0 percent by weight, preferably .005 to .08 percent by weight. It is important to obtain adequate dispersion of the N-acyl p-amino phenol in the polyamide and this can be done by mixing the N-acyl p-amino phenol with the polymer at a temperature above the crystalline melting point of the polyamide, for example, about 5 to 10° F. above the melting point, then letting the temperature drop to cool the mixture. The polymer and the N-acyl p-amino phenol are agitated together as the system is cooled and the mixture reverts from a liquid to a solid.

Nylon 6 synthetic linear polyamide used in the practice of this invention can be derived by polymerization of 6-amino caproic acid or its lactam, generally by direct condensation of the 6-amino caproic acid, its ester or N-formyl derivative or by opening the ring of the caprolactam. These polyamides are obtainable by methods described in British specifications numbered 461,236, 461,237, 474999, and 495,790.

The following example will further illustrate the present invention but is not to be considered limiting.

*Example I*

Nylon 6 was heated above its melting point and .08% by weight of N-stearoyl p-amino phenol was added. The heating was continued for 60 seconds under nitrogen with good agitation. The melt was cooled and fiber drawn by pulling the melt at 40 feet per 25 seconds at 75° F. and 50% R.H. (relative humidity). The product had a tensile strength of 5.5 (gm./denier). After the film was held in an air oven for 140 hours at 150° C. the tensile strength was between 3.8 and 4.1 (gm./denier). For comparative purposes, a nylon 6 film was made without N-stearoyl p-amino phenol and was found to exhibit a tensile strength of 5.7 (gm./denier). However, after it was held 140 hours at 150° C. in the air oven it had a tensile strength of 1.5 (gm./denier).

Examination of the results clearly shows that a nylon 6 film containing small amounts of N-stearoyl p-amino phenol has a tenacity at high temperatures of approximately 2 to 3 times that of a nylon 6 film containing no N-stearoyl p-amino phenol. Others of the N-acyl p-amino phenols such as N-lauroyl, N-palmitoyl and N-arachitdoyl give improvements in this respect.

The improved polyamide of the present invention can be converted into any of the forms suitable for polyamides generally, such as yarns, tire cord, bristles, fabrics, molded articles, films, and coatings, e.g. for filaments, textiles, wood, rubber, leather, and ceramic materials, and are particularly useful in the above forms, when intended to be exposed to elevated temperatures. Thus, they form especially valuable textile fabrics by reason of their stability toward the high temperatures encountered in laundering, calendaring and ironing operations. In addition to high temperature tensile strength the compositions of the present invention possess improved adhesion to rubber compounds such as butyl rubber, and therefore, are advantageously suited for use as cord in the production of automobile tires.

I claim:

1. A composition of matter consisting essentially of a high molecular weight linear poly-caproamide-6 and a minor amount sufficient to improve the tensile strength of said polycaproamide-6 of N-acyl p-amino phenol in which the acyl radical has about 12 to 22 carbon atoms.

2. The composition of claim 1 in which the acyl radical is stearoyl.

3. The composition of claim 2 which contains about .005 to .08 percent by weight of N-stearoyl p-amino phenol.

4. The composition of matter of claim 1, wherein the amount of N-acyl-p-amino phenol is from about .001 to 1.0 percent by weight.

References Cited in the file of this patent

UNITED STATES PATENTS

| | | |
|---|---|---|
| 2,264,293 | Brubaker | Dec. 2, 1941 |
| 2,302,819 | Vaala | Nov. 24, 1947 |
| 2,653,158 | Young | Sept. 22, 1953 |